United States Patent
Klein et al.

(10) Patent No.: US 10,932,423 B2
(45) Date of Patent: Mar. 2, 2021

(54) SPRINKLER CONTROL METHOD FOR COORDINATION ACROSS MULTIPLE FLOW CONTROLLERS

(71) Applicant: Rachio, Inc., Denver, CO (US)

(72) Inventors: Christopher Michael Klein, Denver, CO (US); Bradley Wilson Alcorn, Denver, CO (US); Franz David Garsombke, Golden, CO (US); Nikolay Gennadyevich Sarychev, Denver, CO (US)

(73) Assignee: RACHIO, INC., Denver, CO (US)

( * ) Notice: Subject to any disclaimer, the term of this patent is extended or adjusted under 35 U.S.C. 154(b) by 203 days.

(21) Appl. No.: 15/629,113

(22) Filed: Jun. 21, 2017

(65) Prior Publication Data

US 2017/0359976 A1 Dec. 21, 2017

Related U.S. Application Data

(60) Provisional application No. 62/352,855, filed on Jun. 21, 2016.

(51) Int. Cl.
*A01G 25/16* (2006.01)
*A01G 25/00* (2006.01)

(52) U.S. Cl.
CPC .............. *A01G 25/16* (2013.01); *A01G 25/00* (2013.01)

(58) Field of Classification Search
None
See application file for complete search history.

(56) References Cited

U.S. PATENT DOCUMENTS

| | | | | |
|---|---|---|---|---|
| 2009/0099701 A1* | 4/2009 | Li | ............................ | A01G 25/16 700/284 |
| 2009/0164049 A1* | 6/2009 | Nibler | .................... | G05B 15/02 700/276 |
| 2013/0131874 A1* | 5/2013 | Shupe | .................... | A01G 25/16 700/284 |
| 2014/0222223 A1* | 8/2014 | Horton | ................. | G05D 7/0617 700/284 |
| 2014/0241354 A1* | 8/2014 | Shuman | ................... | H04L 67/16 370/390 |
| 2015/0081114 A1* | 3/2015 | Romney | ............... | A01G 25/165 700/284 |
| 2016/0057949 A1* | 3/2016 | Williams | ............. | A01G 25/167 700/284 |
| 2018/0014480 A1* | 1/2018 | Montgomery | ......... | A01G 25/16 |

* cited by examiner

*Primary Examiner* — Bernard G Lindsay
(74) *Attorney, Agent, or Firm* — Dorsey & Whitney LLP

(57) ABSTRACT

Disclosed herein are methods and systems for improving performance of sprinkler control systems using aggregations of flow controllers. As an example, to facilitate control of multiple controllers, a system may generate a virtual flow controller by aggregating the two or more flow controllers. A schedule for the virtual controller is set or received and then translated into schedules for the aggregated controllers. In another example, schedules may be set for individual watering zones, which are then translated into watering schedules for flow controllers corresponding to the zones. The system then transmits these schedules to a respective flow controller, which then carries out an irrigation routine according to the schedule.

15 Claims, 8 Drawing Sheets

SPRINKLER CONTROL METHOD FOR COORDINATION ACROSS MULTIPLE FLOW CONTROLLERS

CROSS-REFERENCE TO RELATED APPLICATIONS

The present disclosure claims priority to U.S. provisional application No. 62/352,855 entitled "SPRINKLER SYSTEM WITH COORDINATION ACROSS MULTIPLE FLOW CONTROLLERS," filed on Jun. 21, 2016, which is hereby incorporated by reference herein in its entirety.

FIELD

The present disclosure relates generally to methods and systems for improving performance of smart water flow control systems (e.g., smart landscape watering systems).

BACKGROUND

Conventional landscaping sprinkler systems have their irrigation schedules set manually at the beginning of a watering season and are typically not adjusted based on weather. Additionally, homeowners typically lack knowledge about landscaping and sprinkler systems to create an optimal irrigation schedule. The result is often an over-watered lawn with wasted water as runoff, an under-watered lawn, or both depending on the sprinkler zone or location with the sprinkler zone.

Recent advances in watering systems include smart watering systems. Smart watering systems control irrigation schedules of a sprinkler system. This may include automatically updating irrigation schedules based on qualitative and quantitative feedback and meteorological data. Smart sprinkler systems may match optimal or near-optimal irrigation schedules to sprinkler zones based on landscaping and sprinkler system characteristics. An example of a smart watering system is disclosed in U.S. Patent Application Publication No. 2015/0319941, entitled "System and method for an improved sprinkler control system," filed May 6, 2014, which is incorporated herein by reference for any and all purposes.

Although smart watering systems can enhance watering, there remains a need for new and improved designs. In particular, there remains a need for systems and methods that provide a more flexible and robust approach to the control of multiple smart watering flow controllers.

SUMMARY

In one embodiment, a method of optimizing control of a watering system is disclosed. The method includes receiving at a processing element, controller data for a plurality of flow controllers, where each of the plurality of flow controllers selectively opens and closes water valves for one or more irrigation zones; utilizing the controller data to generate by the processing element a virtual flow controller corresponding to the plurality of flow controllers; setting or receiving by the processing element a watering schedule for the virtual flow controller; translating the watering schedule for the virtual flow controller into controller specific schedules for opening and closing the water valves connected to each of the plurality of flow controllers; and operating the plurality of flow controllers based on the controller specific schedules to open and close the water valves for select time periods for the one or more irrigation zones.

In another embodiment, a method for optimizing control of a smart watering system is disclosed. The method includes setting or receiving by the processing element a watering schedule for one or more watering zones; translating the watering schedule for the watering zones into multiple schedules corresponding to a plurality of flow controllers associated with the one or more zones; and transmitting by the processing element each of the multiple schedules to a respective flow controller of the plurality of flow controllers.

In another embodiment, a method for optimizing control of a smart watering system is disclosed. The method includes setting or receiving by a processing element a plurality of watering schedules for a one or more watering zones, comparing by the processing element the plurality of watering schedules to detect a conflict in the plurality of watering schedules, responsive to detecting a conflict in the plurality of watering schedules, adjusting by the processing element a watering schedule of the plurality of watering schedules to resolve the detected conflicts, translating by the processing element the plurality of watering schedules for the one or more watering zones into multiple schedules corresponding to a plurality of flow controllers associated with the one or more watering zones based on the adjusted watering schedule, and transmitting by the processing element each of the multiple schedules to a respective flow controller of the plurality of flow controllers.

SPECIFICATION

Overview

Figure 1A:
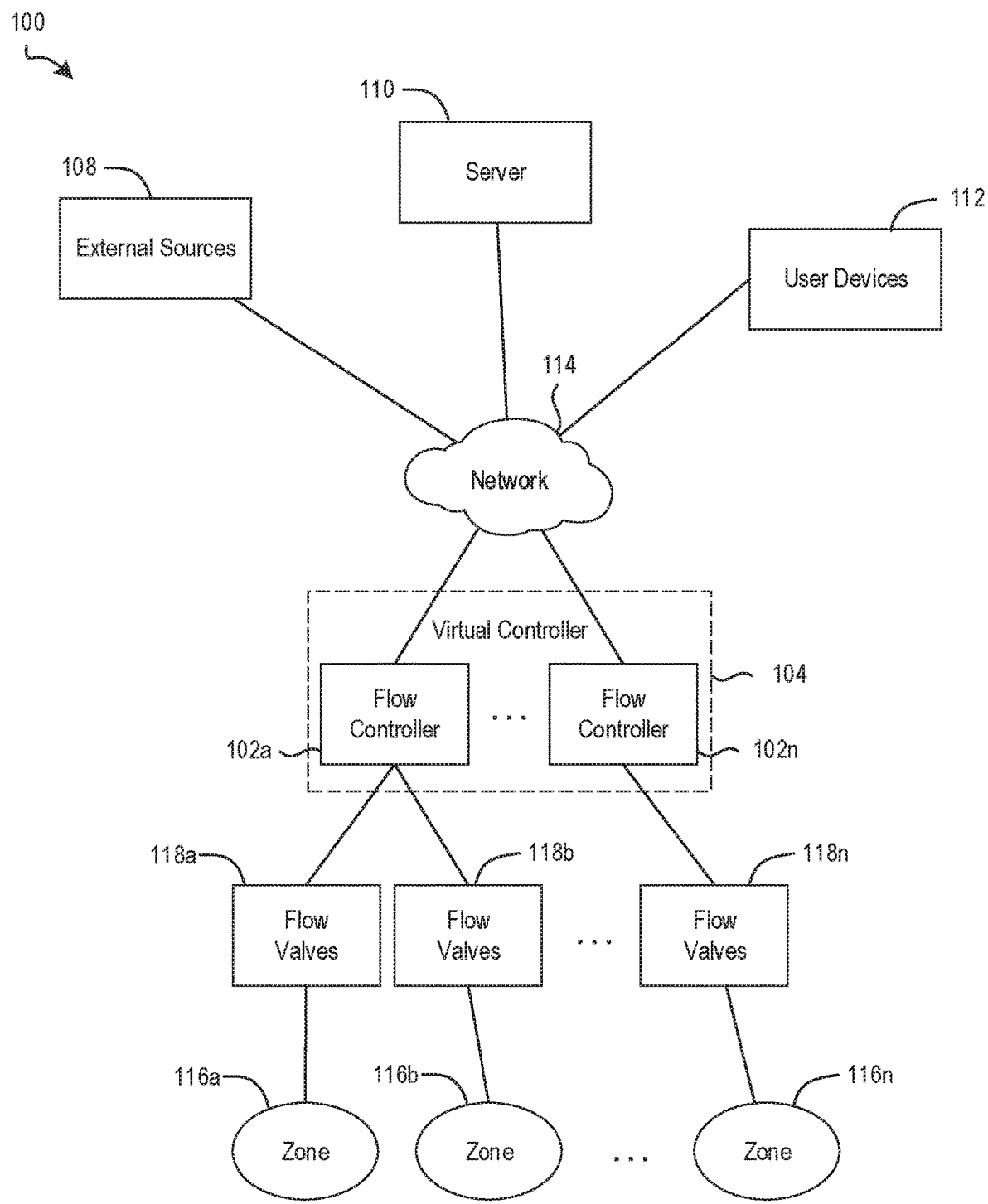
FIG. 1A is a block diagram illustrating an example system for controlling and scheduling smart watering systems.

Systems and methods for using flow controller coordination to improve smart watering system performance are disclosed. The present disclosure provides improved flexibility and ease of use when managing multiple, related, separate flow controllers, such as one or more sprinkler controllers for an irrigation system. Such embodiments allow advanced coordination between flow controllers (either directly or indirectly) and provide improved watering and water savings, while still allowing the flow controllers to remain energy-efficient, reliable devices that may have reduced manufacturing costs. In one example, a smart watering system facilitates coordination of multiple, flow controllers by aggregating the flow controllers under a single, virtual flow controller for which a server sets and/or receives a watering schedule. The server or each of the flow controllers individually may then translate the virtual flow controller's schedule into device specific schedules for each of the aggregated flow controllers. In another example, the server uses zone configurations to set or receive watering schedules for individual watering zones. The server then translates schedules of the zones into schedules for each zone's respective flow controller.

A watering schedule is a plan for applying amounts of water to one or more watering zones. A watering zone may be a grouping of one or more flow devices or valves and can have particular watering requirements based on zone attributes. Another example of a water zone may include groupings of valves that water similar vegetation/soil irrespective of their physical locations. In short, the watering zones may be varied in a number of different ways, but incorporate different valves that are related in some manner.

One or more flow controllers can control the flow devices of a watering zone. A flow controller uses the watering schedule to control the flow of water to the flow devices to water one or more zones. In some examples, there may be multiple related flow controllers that control watering for one or more zones. Examples of related flow controllers include flow controllers owned or managed by the same entity or user, draw from the same water source, control flow devices irrigating the same property, control flow devices irrigating the same watering zones, are in the same neighborhood or other region, or are otherwise related. Typically, there is at least one valve or flow device per zone and a single flow controller controls the flow of water to multiple zones, but other relationships are possible. For example, there can be a large number of flow devices and flow controllers per zone, such as a neighborhood-level zone that includes many flow controllers and associated flow devices. In many embodiments, the flow controllers are separate such that they do not directly or indirectly communicate with each other. For example, while the flow controllers may be connected to and controlled by the same server, the flow controllers do not directly communicate with each other and may not be aware of each other's existence.

To illustrate the advantages of a smart watering system with coordination across flow controllers, consider an example smart watering system with multiple, non-coordinated flow controllers. A user has a yard with six watering zones. There are two watering zones at a front yard of the user's house, two watering zones at a back yard, and one watering zone at each side yard. A first flow controller selectively directs the flow of water to sprinklers at the front yard zones and one side yard zone. A second flow controller selectively directs the flow of water to sprinklers at the back yard zones and the other side yard zone. The user may have two different flow controllers because each individual flow controller may support connections for only three zones. The user may have multiple flow controllers because the flow controllers need to be physically separate to reach and control the flow to the zones, or for another reason(s). The user controls watering of the zones with a device, such as a smartphone or other device. The user programs the soil, vegetation, and other characteristics of the zones using the device. These characteristics are uploaded to a server. The user can program watering schedules for the zones manually or can allow the server to automatically generate watering schedules using the characteristics. The user has the server generate the schedules. The server does not take into account that the first and second controllers are related and the server generates schedules for the controllers without considering how the schedules may positively or negatively interact. The zones happen to be similar because they are part of the same property. For example, there is little variation in weather and in soil type between zones because the zones are geographically close. Because of the similarities, the server creates similar watering schedules for the first and second controllers. The server pushes the schedules to the flow controllers, which then operate according to the schedules.

Continuing this example, because schedules for the flow controllers are similar, the flow controllers cause sprinklers for multiple zones to be active at the same time. This can be problematic. The home may not have sufficient water pressure to support the sprinklers activating at substantially the same time, resulting in under-watering and uneven watering, which is undesirable and can damage the plants and grass in the yard, or may cause drainage problems for the property. Even if the home has sufficient water pressure to support the flow, the amount of water drawn may exceed limits set by local ordinances. Beyond these issues, the user may simply not want multiple zones to be watered at once because it limits the user's enjoyment of the yard. Another disadvantage can arise when there are multiple, uncoordinated controllers that control watering of a single zone. Without coordinating the controllers, the multiple controllers may separately, fully water the zone multiple times. With coordination, the controllers may work together to water the zone more effectively.

The present disclosure includes a watering system that coordinates the operation of the related flow controllers. The related flow controllers are manually or automatically associated with each other during a registration process, such as during an initial setup of the smart watering system. In one example, to facilitate operation of multiple flow controllers and help prevent undesired reductions in pressure, the system generates a virtual flow controller. The virtual flow controller aggregates multiple, related flow controllers by grouping the functionality of the multiple flow controllers into a single, virtual flow controller. For example, the virtual flow controller can control flow to the zones of each of the aggregated flow controllers. Accordingly, when a user or server creates a schedule for the virtual controller, the schedule accounts for all of the grouped zones. In this manner, the zones are easier to control and schedule using the virtual controller than separate flow controllers. Further, the virtual flow controller lacks the physical limitations of physical flow controllers, such as a maximum number of connections for watering zones or physical proximity. This facilitates operation of multiple flow controllers and helps prevent undesired reductions in pressure. Additionally, the virtual flow controller can assist a user in scheduling watering for flow controllers in different physical locations, including different time zones.

When setting the schedule for the virtual flow controller, the server may determine optimal watering for each zone based on the respective zone's conditions. In an example, the server accounts for soil type, vegetation type, incline, sun exposure, sprinkler configuration, previous watering amounts, user preferences, and other characteristics. The server also accounts for historic, current, and predicted weather conditions, including temperature, wind, humidity, sun, and rain to optimize watering. With the optimal watering amount for each zone determined, the server reconciles the determined watering amounts with the capabilities of the watering system and the other zones.

In one example, the server generates an optimal watering schedule for each zone and then combines the schedules for each zone under the virtual controller. The server then validates the combined schedule to determine whether the schedule is in compliance with a set of templates or validation criteria. The criterion can include characteristics, patterns, preferences, or rules for the smart watering system, e.g., a total amount of water that can be drawn at once, a total number of zones that can be watered at once, a total amount of water that violates local requirements, a preferred time of day for watering, and other rules. If the combined schedule fails validation, then the server modifies the schedule until the schedule is in compliance or the server warns the user that the schedule is out of compliance. For instance, optimal watering may require that all of the zones be watered at the same time, but this may exceed the watering system's capabilities (e.g., there is not enough pressure to supply water to all of the zones). The server would then balance these factors by adjusting the watering schedule to be the most-optimal watering schedule while not exceeding the capabilities of the system or other templates. A user can set the schedule manually rather than using the server to determine optimal watering amounts. The server can check the manual schedule for compliance and alert the user if the schedule is out of compliance.

With the schedule received or set, the server may then translate the watering schedule for the virtual flow controller into multiple schedules for each of the flow controllers. Alternatively, the unified watering schedule may be pushed down to each of the individual flow controllers which then convert into a local watering schedule. Each of the multiple schedules corresponds to one of the flow controllers grouped under the virtual flow controller. In an example, the server iterates through each entry in the virtual flow controller schedule and adds the entry to a schedule for a respective flow controller. The server then transmits each of the multiple schedules to a respective flow controller. The flow controllers then carry out an irrigation routine according to their own respective schedule.

In another example, the flow controllers need not be aggregated under a virtual flow controller. Instead, the server may receive or generate schedules with respect to individual zones using zone configurations. The server may receive or generate one or more zone configurations. A zone configuration describes information regarding one or more watering zones, including flow devices and controllers assigned to the zone, soil type, vegetation type, slope, shade, and other information. If the system does not have an existing zone configuration, then the system or user may configure watering zones by assigning valves or controllers to particular zones. The system sets or receives watering schedules for these zones using the zone configurations. As with the virtual controller, the system reconciles the watering schedules with the capabilities of the watering system. In particular, the server checks the schedules and the zone configurations against one or more templates to check for compliance. If the combined schedule is out of compliance with one or more templates, then the server modifies the schedule until the schedule is in compliance or the server warns the user that the schedule is out of compliance. The system then translates the zone watering schedules into watering schedules for flow controllers, such as by iterating through each zone's schedule and adding the schedule to a flow controller that directs water flow for the zone. The system then transmits these schedules to a respective flow controller, which then carries out an irrigation routine according to the schedule.

Now suppose that the example user's smart watering system is upgraded with coordination across flow controllers. If the user's smart watering system uses a virtual flow controller, the system may aggregate the first and second flow controllers into a single virtual controller that controls the watering for zones one through six. In this manner, the system may present the user with a user interface to set the schedule for the virtual controller, which controls zones one through six. Alternatively, the system may automatically set the schedule for the virtual controller. With the schedule set, the smart watering system translates the virtual controller's schedule into schedules usable by the first and second flow controllers. If the user's smart watering system uses zone configurations, the system may provide scheduling the watering for zones one through six. In this manner, the system may present the user with a user interface to set the schedules for all six zones. Alternatively, the system may automatically set the schedule for the zones. With the schedules set, the smart watering system groups the schedules for the individual zones according to each zone's corresponding controller. The server then translates the groups into schedules usable by the first and second flow controllers.

The server then transmits the translated schedules to the first and second flow controllers, which then carry out their respective watering schedule. Because the server accounted for the separate flow controllers when setting and checking the schedules, the watering schedules that are carried out overcome the problems present in non-coordinated systems.

In another example, there is a region-wide (e.g., neighborhood, city, county, state, or other level) water schedule that at least partially dictates schedules of flow controllers within the region. This can be achieved by aggregating individual flow controllers or zones within the region, aggregating already-aggregated groups of flow controllers or zones (e.g., groups aggregated at an individual home level), or a combination thereof. The region-wide water schedule then dictates the watering schedules of flow controllers within the region based on attributes of the region, such as available water to the region, the region's water needs, water pressure for the region, or other attributes. For instance, a neighborhood-wide schedule directly controls the schedules of flow controllers within the neighborhood, or a user within the neighborhood is prevented from setting a schedule for the user's flow controller that would conflict with the neighborhood-wide schedule.

In some embodiments, the system may be used to allow a user to select a predetermined watering schedule that is translated across multiple flow controllers. As an example, a user may have properties with flow controllers in different physical locations, such as in two different time zones. In this example, the user can input a watering schedule (e.g., Monday, Wednesday, and Friday at 9 am for 10 minutes) into the virtual controller from a first time zone. The virtual controller then translates the watering schedule into the controller specific time zone to ensure that each flow controller waters at 9 am local time, which may be two hours off of the time zone where the user entered in the information. The flow controller may include location information, and use this information to determine physical location and/or the location may be entered by a user. By translating the time zone information, the virtual controller eliminates the need for a user to convert entered in time into a flow controller location time. Thus, a user can enter the desired watering schedule once into the virtual controller, rather than multiple times for each of the flow controllers.

Additionally, in some embodiments, each flow controller may have a local watering schedule (such as one set by the user) that may need to be taken into account with the shared schedule. In these embodiments, the user set watering times may be compared to the new shared watering schedule pushed down from the virtual controller. A processing element, such as one in the flow controller and/or a server may then compare the shared schedule to the local watering times. If there is a conflict between the two, e.g., the same start time or a start time that will overlap with a previous watering time, the processing element will offset one of the two scheduled watering times or watering events. For example, the shared scheduled watering may be offset from the local watering, such that if the local watering schedule starts at 9 am for 10 minutes and the unified watering schedule includes a watering that starts at 9 am for 10 minutes, the unified watering schedule may be stacked to begin at 9:10 am to ensure that the two schedules are each given a chance to run with sufficient water pressure and without interfering with one another. Alternatively, the virtual controller may give the user a chance to cancel or modify one of the schedules or may automatically cancel one of the watering events as being redundant.

Using the system and methods disclosed herein, individualized or specialized flow controllers for set numbers of zones do not need to be separately manufactured. Rather, generic flow controllers with a limited number of zones can be used in together to control the flow operation of all the zones or sprinkler valves on a property. This allows basic, easy to manufacture, and low cost flow controllers, to be able to be customized for a particular property, scaled up or down as a user's watering needs varying, and the like. Conventional flow controllers do not offer these types of customization options from a basic controller.

DETAILED DESCRIPTION

Turning now to the figures, the system and methods of the present disclosure will be discussed in more detail. FIG. 1A is a block diagram illustrating an example system 100 for controlling and scheduling irrigation of zones. The system 100 includes one or more flow controllers 102a and 102n (collectively, "flow controllers 102") optionally aggregated into a virtual controller 104, external sources 108, one or more servers 110, and one or more user devices 112. One or more of the various components of the system 100 (or data from those components) may be interconnected together and in communication with one another through a network 114. In some embodiments, the flow controllers may not be in communication with one another, but rather may each be in communication with the virtual controller.

The flow controller 102 controls or regulates flow to one or more flow devices, such as one or more sprinklers (e.g., pop-up sprinklers, rotating sprinklers, and impact sprinklers), drip-irrigation tubes, or the like. In one example, the flow controller 102 controls the operation of a plurality of flow valves 118a, 118b, 118n (collectively, "flow valves 118") that supply water to flow devices corresponding to one or more watering zones 116a, 116b, 116n (collectively, watering zones 116). The flow valves 118 can be electronically-operated flow valves, such as solenoid valves, that open and close a flow path to a sprinkler head. The flow controller 102 causes a signal to be sent to the flow valves 118 to control operation of the valves 118. An example of a flow controller 102 that may be used with the system 100 can be found in U.S. Publication No. 2015/0319941, which is incorporated by reference.

In one example, the flow controller 102 polls the server 110 to determine whether to take an action, such as opening or closing one or more flow valves 118. In another example, the flow controller 102 takes actions based on messages received from the server 110 (e.g., the server 110 sends a command to the flow controller 102 to open a valve 118). In yet another example, the flow controller 102 receives a batch of instructions (e.g., an entire month's schedule) from the server 110 at one time. In this manner, the flow controller 102 may be resilient to network connectivity problems. The server 110 can periodically push an updated set of instructions to the flow controller 102 or the flow controller 102 can poll the server 110 to determine if there is an updated set of instructions (e.g., based on weather conditions). The instructions can be formatted as a data structure having a series of scheduled start and stop times (e.g., a UNIX timestamps) for particular flow valves 118. A processor of the flow controller 102 compares a current time with a scheduled action time. Using the comparison, the processor can cause the flow controller 102 to take a particular action, such as opening or closing one or more flow valves 118. In this manner, the flow controller 102 controls the flow of water to a flow device. In one example, the flow controller 102 only has access to and information regarding the valves it can directly control. For instance, the flow controller 102 does not have information regarding other flow controllers 102 on a property.

The external sources 108 are data and/or sensors from various devices or information hubs. The external sources 108 can include computing devices, such as servers, user devices, or the like, that include data on environmental factors (e.g., weather tracking), utility information (e.g., average water usage for a neighborhood or house, average water pricing rates, watering restrictions, etc.), smart home devices (e.g., smart thermostat, alarm system), or the like. The external sources 108 may be devices that provide environmental or external data that is relevant or correlates to the system 100.

The server 110 is a computing device that processes and executes information. The server 110 may include its own processing elements, memory components, and the like, and/or may be in communication with one or more external components (e.g., separate memory storage). An example of computing elements that may be included in the server 110 is disclosed below with respect to FIG. 2. The server 110 may also include one or more server computers that are interconnected via the network 114 or separate communicating protocol. The server 110 may host and execute a number of the processes executed by the system 100 and/or the flow controller 102. In some embodiments, each flow controller 102 may communicate with specialized servers 110 that communicate with a specialized system server 110 or each may communicate with the same server 110 or groups of servers.

The user devices 112 are various types of computing devices, such as smart phones, tablet computers, desktop computers, laptop computers, set top boxes, gaming devices, wearable devices, voice command devices, internet of things hubs, or the like. The user devices 112 provide output to and receive input from a user. For example, the server 110 transmits one or more alerts to the user device 112 to indicate information regarding the flow controller 102. The type and number of user devices 112 may vary as desired and may include tiered or otherwise segmented types of devices (e.g., primary user device, secondary user device, guest device, or the like).

The network 114 may be substantially any type of or combination of types of communication systems for transmitting data either through wired or wireless mechanism (e.g., WiFi, Ethernet, Bluetooth, cellular data, or the like). In some embodiments, certain devices in the system 100 may communicate via a first mode (e.g., Bluetooth) and others may communicate via a second mode (e.g., WiFi).

The zones 116 may be irrigation areas having particular properties. The zones 116 can be areas logically or physically separated by location (e.g., front yard zone, back yard zone, garden zone, etc.), characteristics (e.g., soil type, vegetation type, incline, etc.), flow device coverage (e.g., based on areas to which particular flow valves 118 supply water), connections in the flow controllers 102, or based on other factors. Flow devices may irrigate the zones 116 and the flow devices may receive water from flow valves 118 operated by one or more of the flow controllers 102.

Figure 1B:
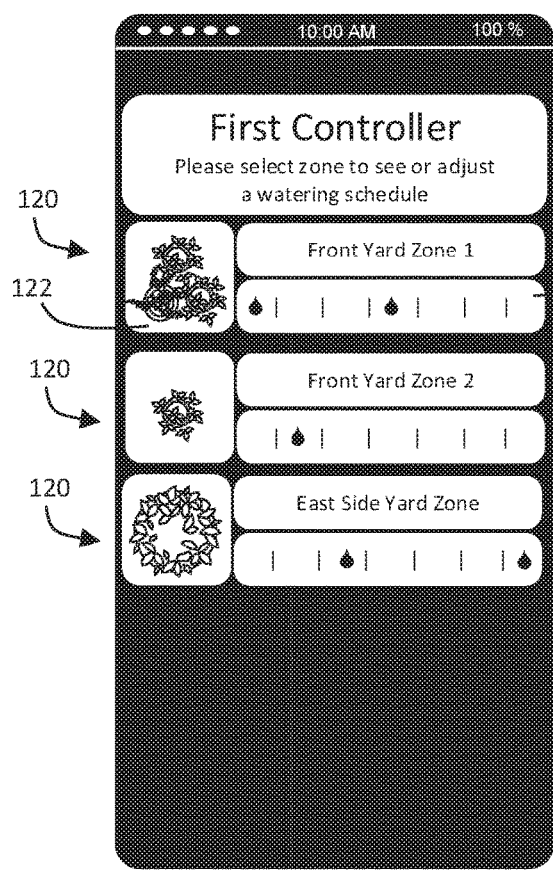
FIG. 1B illustrates an example user interface for viewing and adjusting zone schedules of a first flow controller.

FIG. 1B illustrates an example user interface on a user device 112 for viewing or adjusting zone schedules of a first flow controller 102a. The user interface includes entries 120 corresponding to zones 116 of a controller 102. The entries 120 each include an image 122 representing the zone 116 and a representation of the zone's schedule 124. As illustrated, the schedule 124 uses water drops within seven areas to indicate that the zone 116 is going to be watered on a particular day of the week. This view shows that a first view controller 102a controls watering schedules for a front yard zone 1, a front yard zone 2, and an east side yard zone.

Figure 1C:
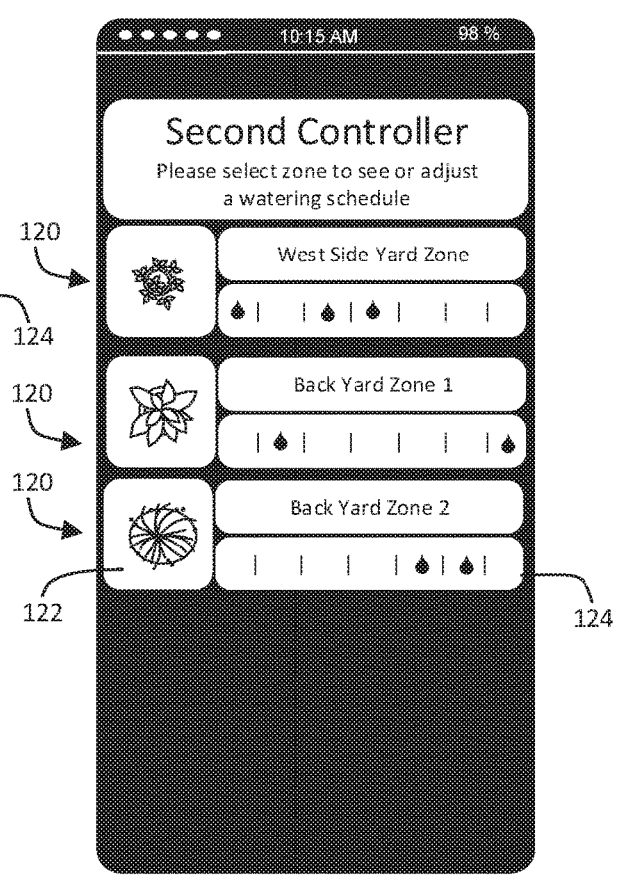
FIG. 1C illustrates an example user interface for viewing and adjusting zone schedules of a second flow controller.

FIG. 1C illustrates an example user interface on a user device 112 for viewing or adjusting zone schedules of a second flow controller 102n. The user interface includes entries 120 with an image 122 and a representation of the zone's schedule 124. As illustrated, the schedule 124 uses water drops within seven areas to indicate that the zone 116 is going to be watered on a particular day of the week. This view shows that a second view controller 102n controls watering schedules for a west side yard zone, a back yard zone 1, and a back yard zone 2.

Together, FIGS. 1B and 1C illustrate user interfaces allowing a user with the first and second flow controllers 102 to view or control the flow controllers 102 in the uncoordinated flow controller example. The smart watering system 100 views and operates the controllers 102 and their respective zones 116 separately, even though the controllers 102a and 102n and zones 116a, 116b, and 116n are related by virtue of being tied to the same property, water system, etc. This causes difficulty when setting the schedules for the flow controllers 102 because the user switches between controllers 102 to set the schedules and constraints to the flow system do not flow across controllers. In addition, because the system 100 understands the flow controllers 102 separately, the system 100 cannot take the relationship between the controllers 102 into account when checking schedules for compatibility or automatically generating a schedule. In this manner, various issues, such as over watering, under pressurized flow, and the like, occurs when the flow controllers are operating since constraints are not set based on the property limitations as the controllers operate autonomously.

Figure 2:
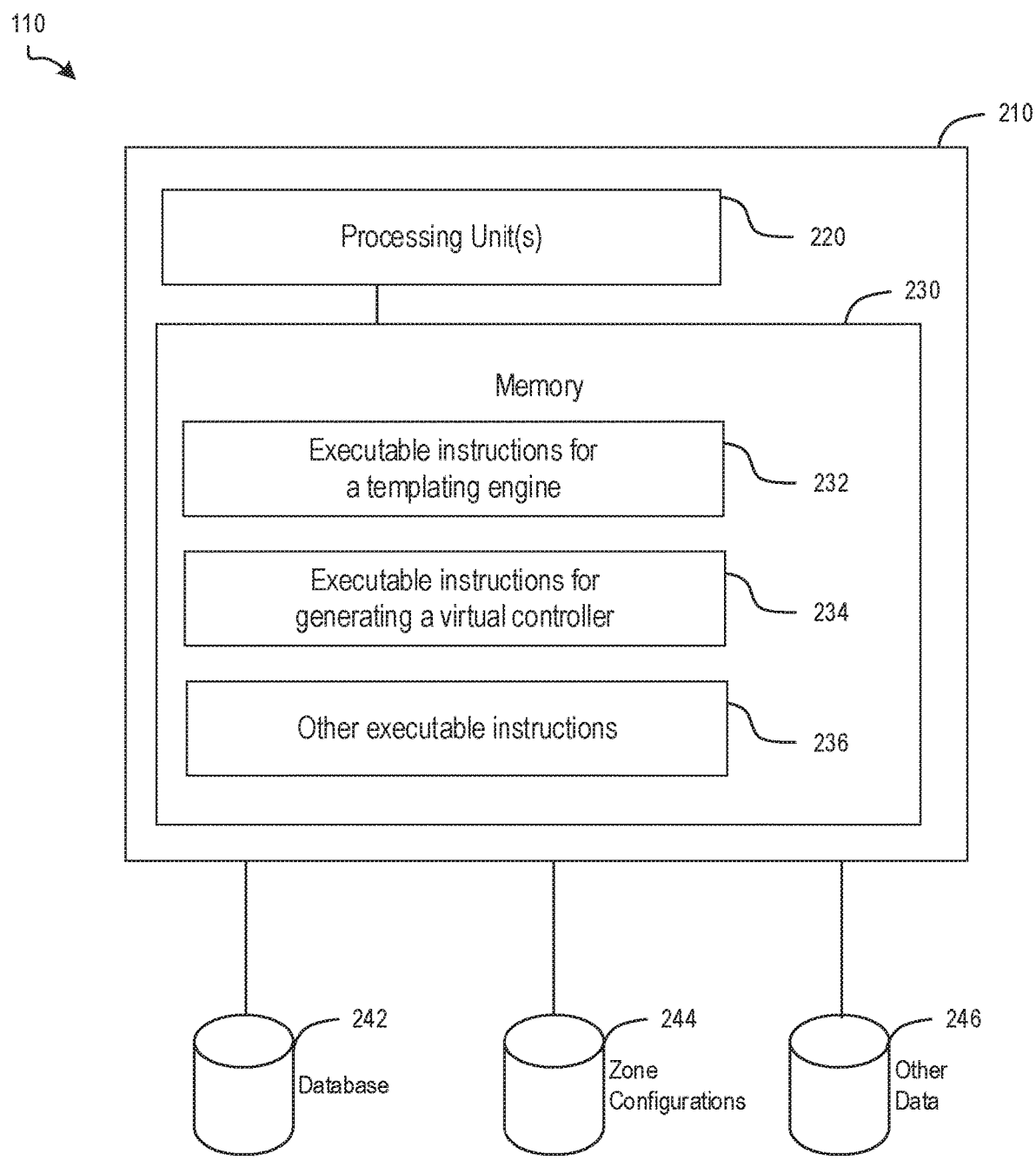
FIG. 2 is a schematic illustration of a server.

FIG. 2 is a schematic illustration of the server 110 arranged in accordance with examples described herein. The server 110 includes a computing device 210 including one or more processing units 220 and memory 230. The memory 230 is encoded with executable instructions for a templating or validation engine 232, executable instructions for generating a virtual flow controller 234, and other executable instructions 236. The computing device 210 is in communication with electronic storage for a database 242, electronic storage for zone configurations 244, and electronic storage for other data 246. In this manner, the computing device 210 is programmed to provide some or all of the processes described herein.

The arrangement of computing components is flexible and may vary depending on various design parameters and requirements. Although shown as contained in a single computing device 210, the processing units 220 and the memory 230 can be provided on different devices in communication with one another. Similarly, although the executable instructions are shown encoded on a same memory 230, a different computer readable media can be used and/or the executable instructions may be provided on multiple computer readable media and/or any of the executable instructions may be distributed across multiple physical media devices. The electronic storage for a database 242, electronic storage for zone configurations 244, and electronic storage for other data 246 are shown in separate electronic storage units also separated from the computing device 210, but they need not be. In other examples, one or more of the storage 242, 244, 246 may be stored in the computing device 210, such as in memory 230 or elsewhere, such as in a device separate from the computing device 210.

Computing device 210 may be implemented using generally any device sufficient to implement the systems and methods described herein. The computing device 210 can be implemented using a computer (e.g., a server, desktop, laptop, tablet, or mobile phone) or a virtual machine. The processing unit(s) 220 includes one or more processors or other circuitry for performing processing tasks described herein. The memory 230 and storage 242, 244, 246 are implemented using a suitable electronically-accessible memory, such as a non-transitory computer-readable medium.

Figure 3A:
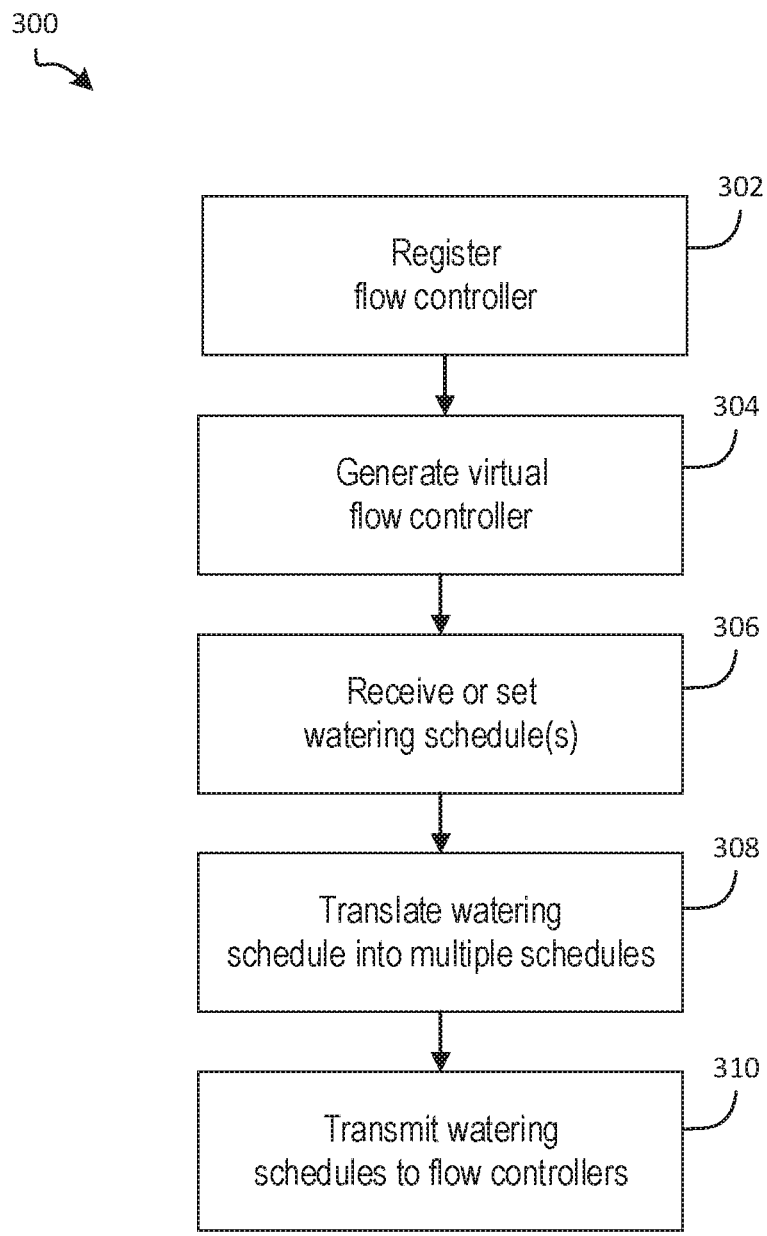
FIG. 3A illustrates a method for providing watering schedules for multiple flow controllers using a virtual flow controller.
Figure 4A:
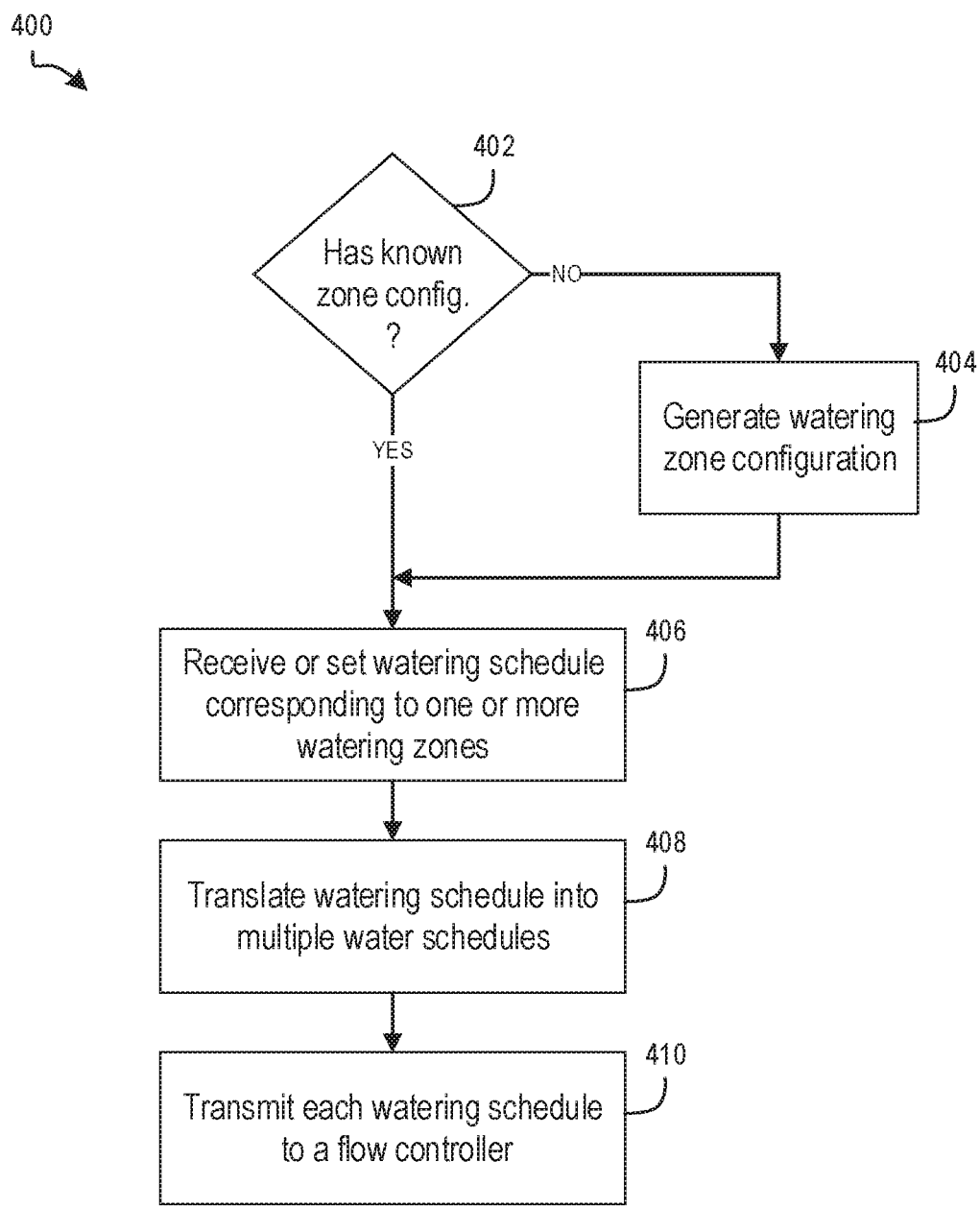
FIG. 4A illustrates a method for providing watering schedules for multiple watering zones.

The executable instructions for a templating engine 232 are executable to provide or implement the systems and methods described herein, such as those described in relation to FIG. 3A and FIG. 4A. The templating engine 232 provides instructions to the one or more processing units 220 to translate a schedule into instructions usable by a flow controller 102 for actuating valves 116 according to the schedule. The executable instructions for generating a virtual flow controller 234 may be executed to provide or implement the systems and methods described herein, such as those described in relation to FIG. 3A.

The database 242 is a database configured to store information regarding the systems and methods described herein. The database 242 includes, for example, data regarding smart sprinkler system owner credentials, information regarding the location and configuration of smart sprinkler systems and components thereof, registration information, and other information suitable for storage within a database. The zone configurations 244 describe one or more watering zones. The zone configurations 244 include information such as information regarding sprinklers, flow valves, flow devices, controllers assigned to the zones, characteristics regarding the zones (e.g., soil type, vegetation type, slope, and shade), and other information.

FIG. 3A illustrates a method 300 for providing watering schedules for multiple flow controllers 102 using a virtual flow controller 104. In an example, the method begins with operation 302 in which the server 110 registers a flow controller 102a. The server 110 registers the flow controller 102a by storing registration information about the flow controller 102a, such as in database 242. In an example, the server 110 receives and stores the registration information about the flow controller 102a during a configuration of the controller 102a (e.g., as when a user first sets up the flow controller 102a for use). The registration information can be received from the user via the user device 112 used to set up the controller 102a, the controller itself 102a, other sources, or combinations thereof. The registration information includes information about the user of the flow controller 102a (e.g., the user's name, email address, log-in credentials) and the flow controller itself (e.g., serial number, firmware version number, physical address, internet protocol address, zone configurations, and status).

While registering the flow controller 102a, the server 110 determines whether other flow controllers 102 are related to the flow controller 102a. In an example, the server 110 asks the user whether there are any related flow controllers 102 or if there are additional, related flow controllers 102 to register next. In another example, the server 110 consults stored information to determine whether there may be a related controller 102n. For instance, the sever 110 can query the database 242 to determine whether there are other flow controllers 102 registered to the user, other flow controllers 102 at the address of the flow controller 102a, or other flow controllers 102 using the same wireless network as the flow controller 102a. The server 110 can ask the user whether the found flow controller 102n is actually related (e.g., the user may have sold an old flow controller 102 and purchased a new flow controller 102a). Once a related flow controller 102n is found, the server 110 associates the flow controllers 102a, 102n with each other. The server 110 can also receive or determine information regarding how the flow controllers 102 are related. In an example, such information includes whether the flow controllers 102 draw from the same water source or whether the flow controllers 102 are considered to water the same property (e.g., for compliance with local ordinances). The server 110 stores the relatedness information for later use, such as for use in applying templates or otherwise coordinating the activities of the controllers 102.

After operation 302, the method 300 may proceed to operation 304 in which the server 110 aggregates the registered flow controllers 102 into the virtual controller 104. The virtual flow controller 104 may provide an abstraction layer for the separate flow controllers 102a and 102n and allow users and other components of the system 100 to interact with the flow controllers 102a and 102n as though they were a single flow controller 102, thereby improving the functionality of the system 100.

In an example, the server 110 has a data structure corresponding to flow controller 102a and a data structure corresponding to flow controller 102n that contains information regarding the configuration of the respective flow controller 102a or 102n, such as information gathered during operation 302. These data structures may include information regarding the zones 116 controlled by the flow controllers 102a or 102n, the geographic location of the zones 116, ownership information for the controllers 102a or 102n, networking information for the controllers 102a or 102n, and other useful data. When generating the virtual controller 104, the server 110 creates a new data structure that groups information corresponding to the flow controllers 102. The new data structure includes information regarding each zone 116a, 116b, and 116n as though the virtual controller 104 can control flow devices or valves related to each zone 116a, 116b, and 116n. For example, a list data structure for the flow controller 102a can be used that contains entries for each zone 116 controlled by the flow controller 102a, flow controller 102n can include a similar list data structure. There is another list data structure for the virtual flow controller 104, which contains all of the entries of the list data structures of both the flow controller 102a and flow controller 102n. The data structure can further include or contain a reference to information regarding the flow controllers 102a and 102n as separate controllers. Alternatively, this information may be stored elsewhere, such as in zone configurations 244. This information is used later when translating a schedule of the virtual controller 104 into schedules for the flow controllers 102.

After operation 304, the method 300 may proceed to operation 306. In operation 306, the server 110 receives or sets one or more watering schedules corresponding to the virtual flow controller 104. In one example, the system 100 presents the user with a user interface (e.g., displaying the user interface on the user device 112, see FIG. 3B) for setting or controlling the setting of the watering schedule of the zones of the virtual controller 104. In another example, the system 100 automatically sets a watering schedule for the zones of the virtual flow controller 104 based on user preferences and/or other information (e.g., weather data). Because the flow controllers 102 are aggregated under the virtual flow controller 104, the server 110 has knowledge of the zones of the aggregated controllers and can take this into account when the schedules are set. This knowledge can be used to facilitate scheduling and operation of multiple flow controllers 102 and help prevent undesired reductions in pressure.

In some examples, the server 110 may verify the generated schedule for the virtual flow controller 104 against its knowledge of the flow controllers 102 aggregated under the virtual flow controller 104. In this manner, the server 110 may check for and correct for any conflicts, bugs, or misbehaviors that may be introduced by treating individual controllers 102 as an aggregated, virtual controller 104. In one example, the virtual flow controller schedule is checked to determine whether it is in compliance with a set of templates. The templates act as validation criterion and can include templates for an amount of water that can be drawn at once, a number of zones that can be watered at once, an amount of water that violates local requirements, a preferred time of day for watering, and other templates. There can be user-defined and pre-defined templates. If the virtual flow controller schedule is out of compliance with one or more templates, then the server 110 can modify the schedule until it is in compliance. The server 110 can warn the user if the user attempts to set a schedule that would be out of compliance with a template. For instance, if a user sets a schedule that would cause water pressure to drop to an unacceptable level, the server 110 can alert the user and suggest a modification to the schedule that would be in compliance.

Figure 3B:
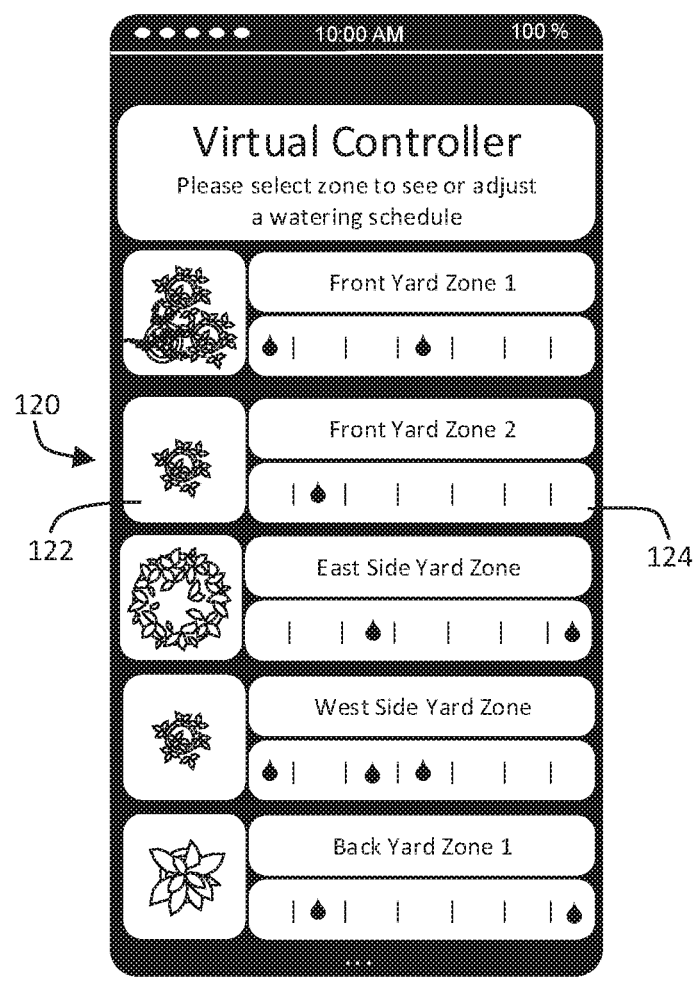
FIG. 3B illustrates an example user interface for viewing and adjusting zone schedules of a virtual zone controller.

FIG. 3B shows an example user interface for controlling watering schedules of the zones of the virtual controller 104. The user interface includes entries 120 corresponding to zones 116 of a controller 102. The entries 120 each include an image 122 representing the zone 116 and a representation of the zone's schedule 124. Because the flow controllers 102 are grouped as the virtual flow controller 104, the zones of the respective controllers 102 are also grouped under the virtual flow controller 104. FIG. 3B—when viewed along with FIG. 1B and FIG. 1C—helps show a user experience advantage of grouping zones under a virtual controller. FIG. 3B shows entries 120 of several zones 116 grouped under the virtual controller 104, despite some of the zones being controlled by different flow controllers 102, whereas the views of FIG. 1B and FIG. 1C show only the zones 116 of the respective controllers.

Returning to FIG. 3A, after operation 306, the method 300 may proceed to operation 308. In operation 308, the server 110 (or each flow controller) translates the one or more watering schedules set in operation 306 into multiple schedules corresponding to the flow controllers 102. In an example, the server 110 executes a templating engine (e.g., templating engine 232) to translate the schedules. The templating engine may, for example, generate initial schedules for each of the flow controllers 102 aggregated under the virtual controller 104; these schedules may be blank initially or may include entries for the local controller watering schedules (e.g., any schedules that are specific to that device, such as those that may have been entered in by a user directly). The templating engine then iterates through the schedule generated in operation 306 and adds scheduling items to each of the schedules for the respective flow controllers 102a and 102n. The templating engine may then translate the schedules into a format understandable by the flow controllers 102, such as a data structure having UNIX timestamp start and stop times for particular flow valves 118.

In some embodiments, the translation may include converting a watering schedule entered into a first time zone into a time zone corresponding to the flow controller physical location. As an example, the unified schedule entered by the user may recite, watering Monday, Wednesday, and Friday for 10 minutes at 9 am. In this example, the templating engine may schedule each of the related flow controllers to operate at 9 am local time, rather than 9 am user time, by converting the user entry into the respective time zones for each controller. In this example, although each of the flow controllers may be operating the same or unified schedule, they may operate at different actual times, each turning on only at 9 am local time. Alternatively, the system may be configured to covert a user entered time, such as 9 am PST, into a time for each of the local controllers, such that each of the flow controllers in the system operate simultaneously. In this example, the system may convert 9 am PST into 10 am MST, so that flow controllers in California and Colorado operate together when executing the unified schedule.

After operation 308, the method 300 may proceed to operation 310. In operation 310, the server 110 transmits each of the watering schedules to a respective flow controller 102a or 102n. The flow controllers 102 use their respective watering schedule to control the operation of the one or more flow valves 118 corresponding to the flow controller 102 to water one or more zones 116. In examples where the unified watering schedule is translated into a local schedule at the flow controllers, the unified schedule may be transmitted or shared across multiple flow controllers and each flow controller processes the unified schedule independently. During this translation, each flow controller converts the unified schedule into a controller specific schedule that accounts for any local watering events already scheduled. In this manner, the controller specific translation of the unified watering schedule may not affect the other related controllers in the system, e.g., the controller specific watering schedule for a first controller does not change the calendar of a second controller, and the shared or unified schedule may operate at the same time on both devices or at different times, depending on the local watering events at each controller.

FIG. 4A illustrates a method 400 for providing watering schedules for multiple watering zones 116, according to some embodiments. The method may begin with operation 402 in which the server 110 determines whether there is a known zone configuration (e.g., zone configuration 244) for the watering zones 116. A zone configuration describes information regarding one or more watering zones, including flow devices and controllers assigned to the zone, soil type, vegetation type, slope, shade, and other information. The zone configuration can include information that the watering zones 116 are related. If there is a known zone configuration for the watering zones 116, then the method may proceed to operation 406. If there is not a known zone configuration for the watering zones 116, then the method 400 may proceed to operation 404.

In operation 404, the server 110 creates one or more zone configurations for the watering zones 116. For example, the server 110 associates the watering zones 116 together using information gathered from a registration or configuration process and stores the association in one or more zone configurations along with other relevant information. Operation 404 can take place during an initial setup or reconfiguration of the smart watering system 100 and can include receiving registration information about flow controllers 102, such as whether there are one or more related flow controllers 102. In operation 404, the server 110 may receive or assign flow devices, flow valves 118, and/or controllers 102 to zones 116. After operation 404, the method 400 may proceed to operation 406.

In operation 406, the server 110 receives or sets one or more watering schedules corresponding to the watering zones 116. In an example, the system 100 presents the user with a user interface (e.g., at the user device 112) for setting or controlling the setting of the watering schedules. In an example, the system 100 automatically set a watering schedule based on user preferences or other information (e.g., weather data).

Figure 4B:
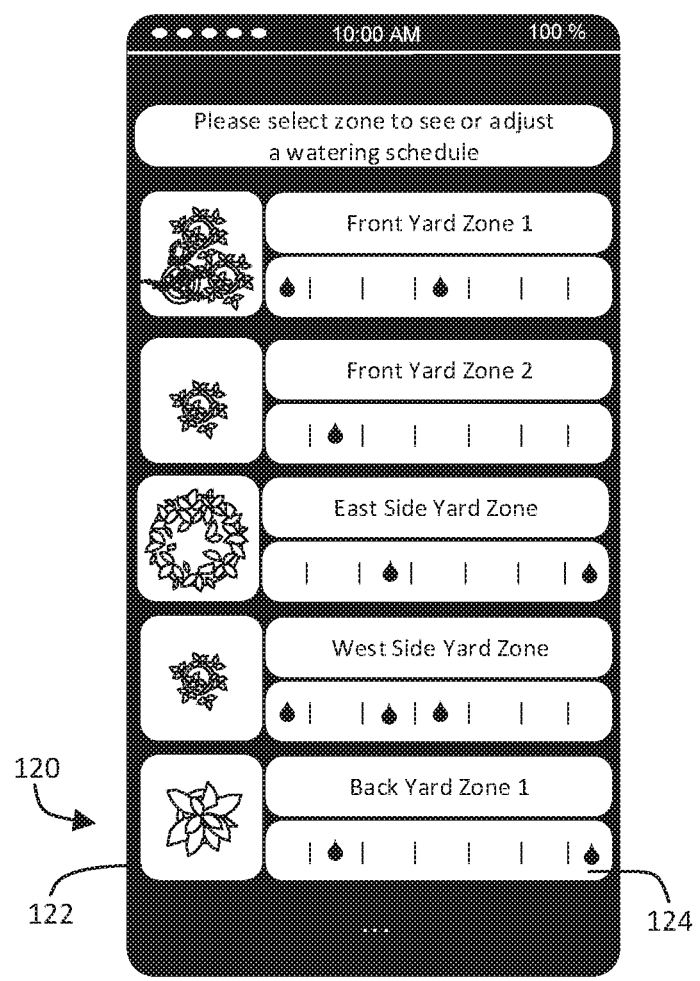
FIG. 4B illustrates an example user interface for viewing and adjusting zone schedules.

FIG. 4B shows an example user interface for controlling watering schedules of multiple zones. The user interface includes entries 120 corresponding to zones 116. The entries 120 each include an image 122 representing the zone 116 and a representation of the zone's schedule 124. Here, the zones 116 are not grouped under a virtual controller 104. Instead, the zones 116 are grouped because of their relationship as defined by a zone configuration. FIG. 4B—when viewed along with FIG. 1B and FIG. 1C—helps show a user experience advantage of grouping zones using zone configurations. FIG. 4B shows entries 120 of related zones 116 grouped together despite some of the zones being controlled by different flow controllers 102. In contrast, the views of FIG. 1B and FIG. 1C show only the zones 116 of the respective controllers 102.

Returning to FIG. 4A, after operation 406, the method 400 may proceed to operation 408. In operation 408, the server 110 translates the one or more watering schedules set in operation 306 into multiple schedules corresponding to the flow controllers 102.

In an example, the server 110 executes a templating engine (e.g., templating engine 232) to translate the schedules. For instance, the templating engine may group the schedules for the watering zones 116 according to flow controllers 102 associated with the watering zones 116. The templating engine may then translate the schedules into a format understandable by the flow controllers 102.

In some examples, the templating engine may verify the generated schedules for the flow controllers 102 against its knowledge of the zone configuration 244 to check for and correct for any conflicts, bugs, or misbehaviors that may be introduced by the schedule. In another example, the templating engine determines whether a generated schedule is in compliance with a set of templates or validation criteria. The templates can include templates for an amount of water that can be drawn at once, a number of zones that can be watered at once, an amount of water that violates local requirements, a preferred time of day for watering, and other templates. There can be user-defined and pre-defined templates. If a schedule (e.g., a schedule for an individual zone 116 or for a flow controller 102) is out of compliance with one or more templates, then the server 110 can modify the schedule until it is in compliance. For instance, the server 110 can modify the schedule by shifting the time, amount, or frequency of watering until the schedule is in compliance. The server 100 can warn the user if the user attempts to set a schedule that would be out of compliance with a template. For instance, the server 110 may detect that the user has set a schedule that would turn sprinklers on in a zone 116 in which the user will be having a cookout later (e.g., by comparing the schedule to a user's calendar), and the server 110 can alert the user and suggest a modification.

After operation 408, the method 400 may proceed to operation 410. In operation 410, the server 110 transmits each of the watering schedules to a respective flow controller 102a or 102n. The flow controllers 102 may then use their respective watering schedules to control the operation of the one or more flow valves 118 corresponding to the flow controller 102 to irrigate one or more zones 116.

Figure 5:
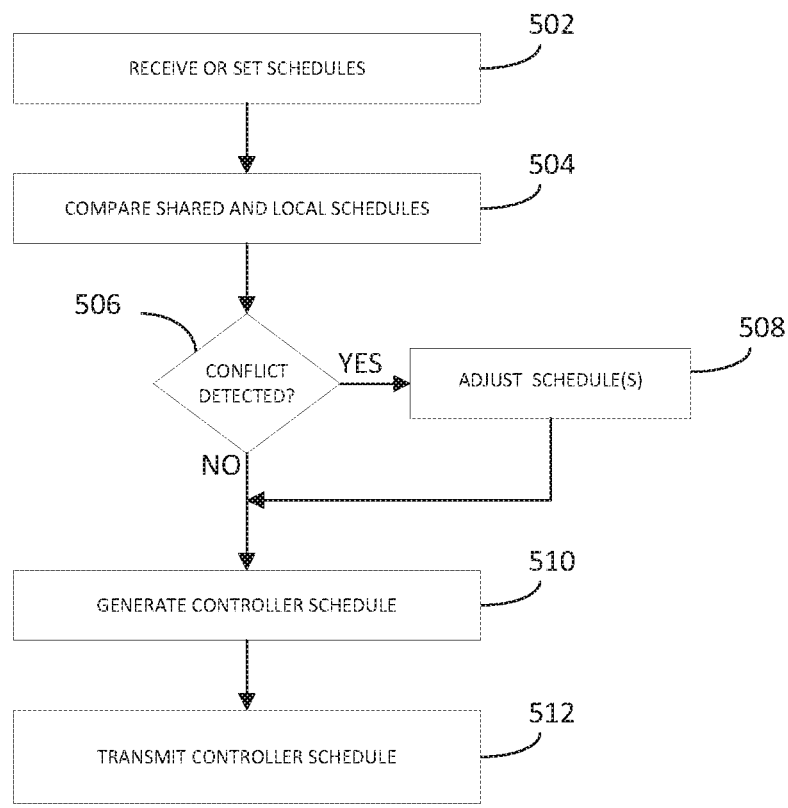
FIG. 5 illustrates a method for providing watering schedules for multiple watering zones.

As noted, in some embodiments the unified or shared schedule may create conflicts with individual local schedules at one or more of the related flow controllers. FIG. 5 illustrates a method for addressing the potential conflicts between the watering schedules. With reference to FIG. 5, the method begins with operation 502 and the server 110 receives or sets watering schedules for multiple zones and/or a unified schedule for multiple controllers. For example, the system 100 presents the user with a user interface (e.g., at the user device 112) for setting or controlling the setting of the watering schedules. In another example, the system 100 automatically set a watering schedule based on user preferences or other information (e.g., weather data, soil and agricultural data, etc.). The unified or shared watering schedules may be set on a zone-by-zone basis or a property-by-property basis. For example, the owner may own several different properties, each with its own flow controller 102, that may be geographically separated (e.g., in different neighborhoods, cities, states, time zones, etc.). The user may provide, and/or have the server 110 automatically generate, schedules for the various properties and the watering zones of those properties. As a specific example, the owner may set a uniform schedule for watering all properties for 15 minutes at 9:00 AM local time on Mondays, Wednesdays and Fridays. The owner may also have the server make determinations about when to water the properties. For example, the server may determine that the properties should be watered at 9:10 AM on Wednesdays and Saturdays for 20 minutes. In other examples, the unified or shared schedule may be a single schedule that may be applied to multiple related flow controllers.

In operation 504, the server 110 compares the unified schedule with one or more local or controller specific schedules to determine whether any conflicts exist. Conflicts may exist where two different watering schedules provide for watering events at the same time and/or activate the same zones at the same time. For example, in the example above where the unified schedule or first schedule includes a watering event at 9:00 AM on Mondays, Wednesdays, and Fridays for zones 1 and 2 and the local or second schedule includes a watering event set for 9:10 AM on Wednesdays and Saturday for zones 1 and 2, there is a conflict on Wednesdays, because two separates schedules call for watering zones 1 and 2 on Wednesdays from 9:10-9:15. In some embodiments, the system may determine there is a conflict, even if the watering events are for different zones, but at the same time and day. This is to ensure that each watering event will receive the full water pressure available for the system. Other types of conflicts may also be detected. For example, if geographically nearby properties or even zones of the same property are watering too close together in time, though not explicitly overlapping, a conflict may still exist. Still other conflicts may be defined based on the particular circumstances of the properties (e.g., soil type, climate, etc.), number of zones, or the property owner's desires (e.g., budget constraints, local laws, etc.).

In decision block 506, the server 110 determines whether a conflict was detected in operation 506. If a conflict was detected (decision block 506, YES branch), then the server 110 adjusts one or more of the schedules in operation 508. For example, the server 110 may delay the shared schedule (e.g., the Wednesday/Saturday schedule) by a fixed time period (e.g., 15 minutes) or set the schedule to begin a certain period of time after the earlier starting schedule completes its watering event. For example, if the Monday/Wednesday/Friday schedule completes at 9:15 AM on Wednesday, the Wednesday/Saturday schedule may be delayed to begin 15 minutes later (e.g., 9:30 AM). Alternatively, the server or other processing element (e.g., one on the flow controller) may adjust the start time and/or date of the local schedule.

In instances where there is a conflict, the system may stack the two watering events. Specifically, the system may adjust the start time or end time of one or more of the watering events from one of the shared schedule or the local schedule, such that the conflict will be avoided. The priority of the watering events may be set or dynamically selected. In one embodiment, the local watering schedule events may take precedence over the unified or shared watering events, such that if there is a conflict, the shared watering events will always be offset, allowing the local watering events to run as originally programmed. In other embodiments, the unified schedule may be the default priority and the local watering schedule events may be offset, reduced, and/or cancelled in light of the unified scheduled events.

In some embodiments, the processing element may use other characteristics to determine a priority for the scheduling conflict. For example, the scheduling events can be ordered alphabetically (e.g., by name of the controller), numbering of scheduled events in a particular schedule, user preference, or the like. In some embodiments, operation 508 operates as a mutual exclusion, preventing the unified schedule and the local schedule to have watering events occurring simultaneously, this helps to ensure each watering event is executed as desired. In some embodiments, the translation of the unified schedule into a controller specific schedule that accounts for local watering events and the local watering schedule may be done the server level and pushed down to the individual controllers. However, in other embodiments, the translation may be done at the flow controller level.

The amount of offset applied to each scheduling event in operation 508 may be determined based on the length of the event, the start time, and/or the end time. Additionally, in embodiments where the watering event may be dynamically variable, such as a watering event that begins at "sunrise" may offset or adjusted for after it begins. In other words, the priority watering event may execute first and the secondary watering event may be triggered to begin upon completion of the priority event. In this manner, the watering events for the unified and the local schedule may be set to have dynamic start and end times, while still allow the offset and combination of the two schedules.

Once the schedules have been stacked in operation 508, or if a conflict was not detected (decision block 506, NO branch), then the server may generate separate schedules for each flow controller 102a-n in operation 510. A schedule that is shared across multiple flow controllers 102 may be processed independently for each flow controller 102. All schedules for each device are considered in operations 502-508 however, each related flow controller 102 generally does not impact the schedules of other flow controllers. In other words, a shared schedule may be executed at the same time on multiple devices or at different times if other local schedules for the particular flow controller 102 cause the schedules to adjust, as described above with respect to operations 504-508. In an example, the server 110 executes a templating engine (e.g., templating engine 232) to translate the schedules. The templating engine may, for example, generate initial schedules for each of the flow controllers 102 aggregated under the virtual controller 104. The templating engine then iterates through the schedules received or set in operation 502 and adds scheduling items to each of the schedules for the respective flow controllers 102a and 102n. The templating engine may then translate the schedules into a format understandable by the flow controllers 102, such as a data structure having UNIX timestamp start and stop times for particular flow valves 118.

In operation 512, the server 110 transmits each of the watering schedules to a respective flow controller 102a or 102n. The flow controllers 102 use their respective watering schedule to control the operation of the one or more flow valves 118 corresponding to the flow controller 102 to water one or more zones 116.

CONCLUSION

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for optimizing control of a watering system, the method comprising:
   receiving at a processing element controller data for a plurality of physical flow controllers, wherein each of the plurality of physical flow controllers selectively opens and closes water valves for one or more irrigation zones and the controller data comprises data on physical location and zone configuration of each of the plurality of physical flow controllers, the zone configuration comprising information on one or more zones associated with the respective physical flow controller;
   analyzing by the processing element the controller data to determine that two or more physical flow controllers of the plurality of physical flow controllers are related;
   aggregating by the processing element the controller data of the two or more physical flow controllers to generate a virtual flow controller corresponding to the two or more physical flow controllers;
   setting or receiving by the processing element a watering schedule for the virtual flow controller as a single flow controller, wherein the watering schedule for the virtual flow controller is displayed by a user interface, wherein the user interface displays each of the zones of the two or more physical flow controllers as a corresponding zone of the virtual flow controller, wherein the user interface displays, in one view, when the zones of the virtual flow controller are scheduled to be watered based on the watering schedule;
   translating by the processing element the watering schedule for the virtual flow controller into at least two controller specific schedules, a first controller specific schedule for a first of the two or more physical flow controllers and a second controller specific schedule for a second of the two or more physical flow controllers for opening and closing the water valves connected to each of the two or more physical flow controllers;
   operating the first physical flow controller based on the first controller specific schedule to open and close a first plurality of water valves for select time periods for one or more first irrigation zones associated with the first physical flow controller; and
   operating the second physical flow controller based on the second controller specific schedule to open and close a second plurality of water valves for select time periods for one or more second irrigation zones associated with the second physical flow controller.

2. The method of claim 1, further comprising transmitting by the processing element the first controller specific schedule to the first physical flow controller and the second controller specific schedule to the second physical flow.

3. The method of claim 1, wherein translating the watering schedule comprises:
   comparing by the processing element the watering schedule with a first local watering schedule for the first physical flow controller;
   adjusting for the first physical flow controller the watering schedule based on the first local watering schedule to create the first controller specific schedule;
   comparing by the processing element the watering schedule with a second local watering schedule for the second physical flow controller; and
   adjusting for the second physical flow controller the watering schedule based on the second local watering schedule to create the second controller specific schedule.

4. The method of claim 3, wherein the first and second controller specific schedules include offset watering times temporally offset from the watering times originally included in the watering schedule for the virtual flow controller, wherein the offset is determined by the respective first and second local watering schedules.

5. The method of claim 1, further comprising:
   merging a first and second local watering schedule specific to each of the respective first and second physical flow controllers with the watering schedule for the virtual flow controller to generate the first and second controller specific schedules; and outputting the first and second controller specific schedules for each of the respective first and second physical flow controllers.

6. The method of claim 1, wherein translating the watering schedule further comprises validating by the processing element the watering schedule of the virtual flow controller for each of the two or more physical flow controllers based on one or more criterion corresponding to at least one of each of the two or more physical flow controllers, the one or more irrigation zones, or the water valves.

7. The method of claim 6, wherein the one or more criterion comprise at least one of: rules for one or more of an amount of water that can be drawn from a water source connected to the respective physical flow controller, a number of sprinkler zones that can be watered simultaneously, an amount of water that violates local rules for water usage, or a preferred time of day for watering.

8. The method of claim 6, further comprising:

responsive to determining that the watering schedule of the virtual flow controller is not in compliance with the one or more criterion, modifying, by the processing element, the watering schedule to bring the watering schedule into compliance with the one or more criterion.

9. The method of claim 1, wherein translating the watering schedule into at least two controller specific schedules comprises:

generating by the processing element an initial schedule for each of the first and second physical flow controllers; and adding by the processing element one or more unified scheduling items shared by the first and second physical flow controllers to each initial schedule based on the watering schedule.

10. The method of claim 9, wherein translating the watering schedule into at least two controller specific schedules further comprises:

comparing one or more unified scheduling items with one or more local scheduling items specific to each of the first and second physical flow controllers;

if one or more unified scheduling items conflict with one or more local scheduling items, offsetting the one or more unified scheduling items from the one or more local scheduling items and outputting a modified watering schedule to the respective first and second physical flow controller; and if one or more unified scheduling items do not conflict with one or more local scheduling items, outputting a combined watering schedule including the watering schedule and the one or more local scheduling items.

11. The method of claim 1, wherein the watering schedule for the virtual flow controller is received from a user device through a user interface for setting the watering schedules for the two or more physical flow controllers as the virtual flow controller.

12. The method of claim 1, wherein the watering schedule for the virtual flow controller is automatically set by the processing element based on one or more of predefined user preferences or weather data.

13. The method of claim 1, wherein the at least two controller specific schedules depend at least in part on the respective controller data specific to each of the first and second physical flow controllers.

14. The method of claim 13, wherein the controller data comprises time zone information for the respective first and second physical flow controller and the first and second controller specific schedules depend at least in part on the time zone information specific to the respective first and second physical flow controller.

15. The method of claim 1, wherein determining the two or more physical flow controllers of the plurality of physical flow controllers are related comprises determining by the processing element that the two or more physical flow controllers share one or more of the following: a wireless network, a location, or an owner.

* * * * *